March 15, 1949.　　　　J. T. CATALDO　　　　2,464,213
APPARATUS FOR TESTING MATERIALS
Filed May 15, 1945　　　　　　　　　　　　　　2 Sheets-Sheet 1
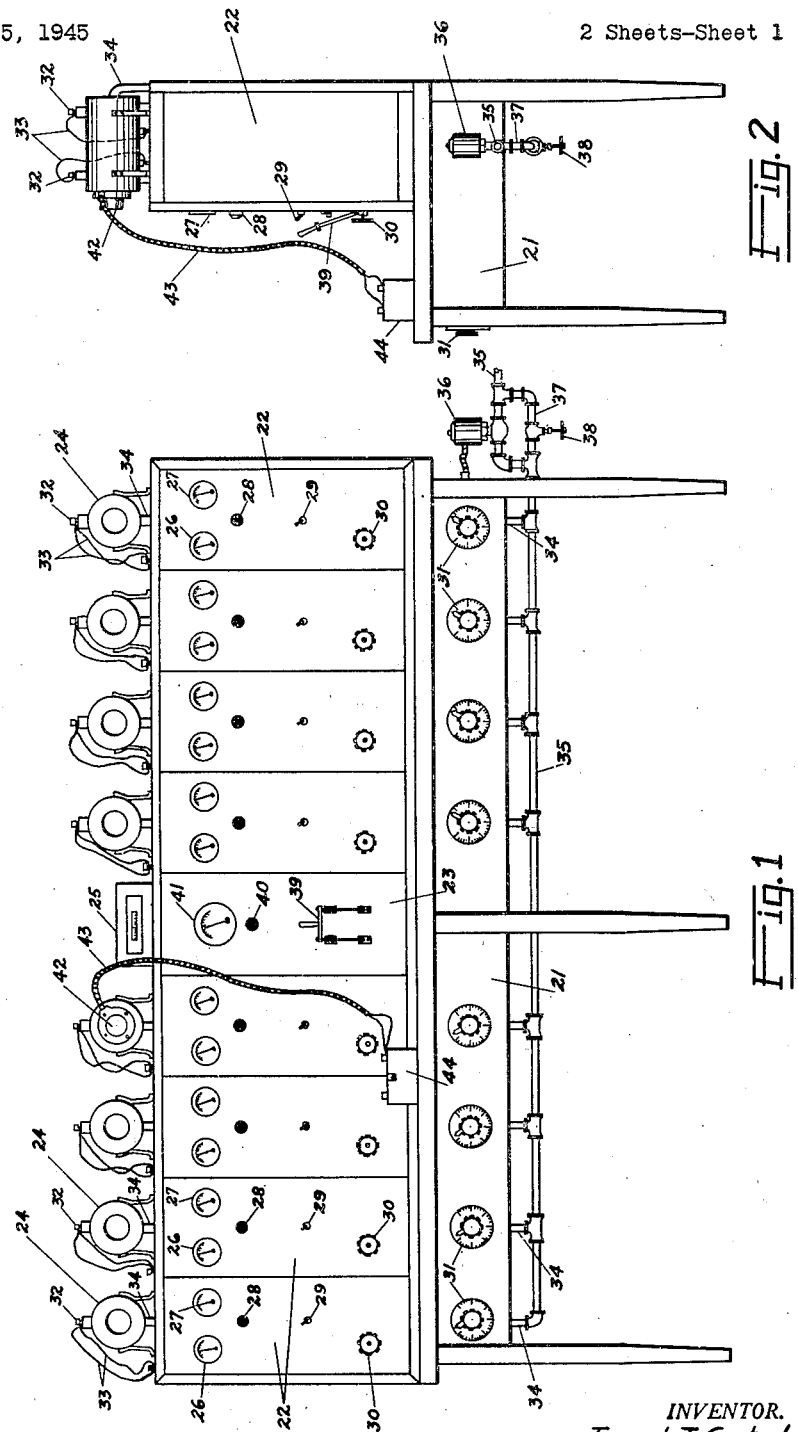
INVENTOR.
Joseph T. Cataldo
BY
Ralph L Chappell
ATTORNEY.

March 15, 1949. J. T. CATALDO 2,464,213
APPARATUS FOR TESTING MATERIALS
Filed May 15, 1945 2 Sheets-Sheet 2
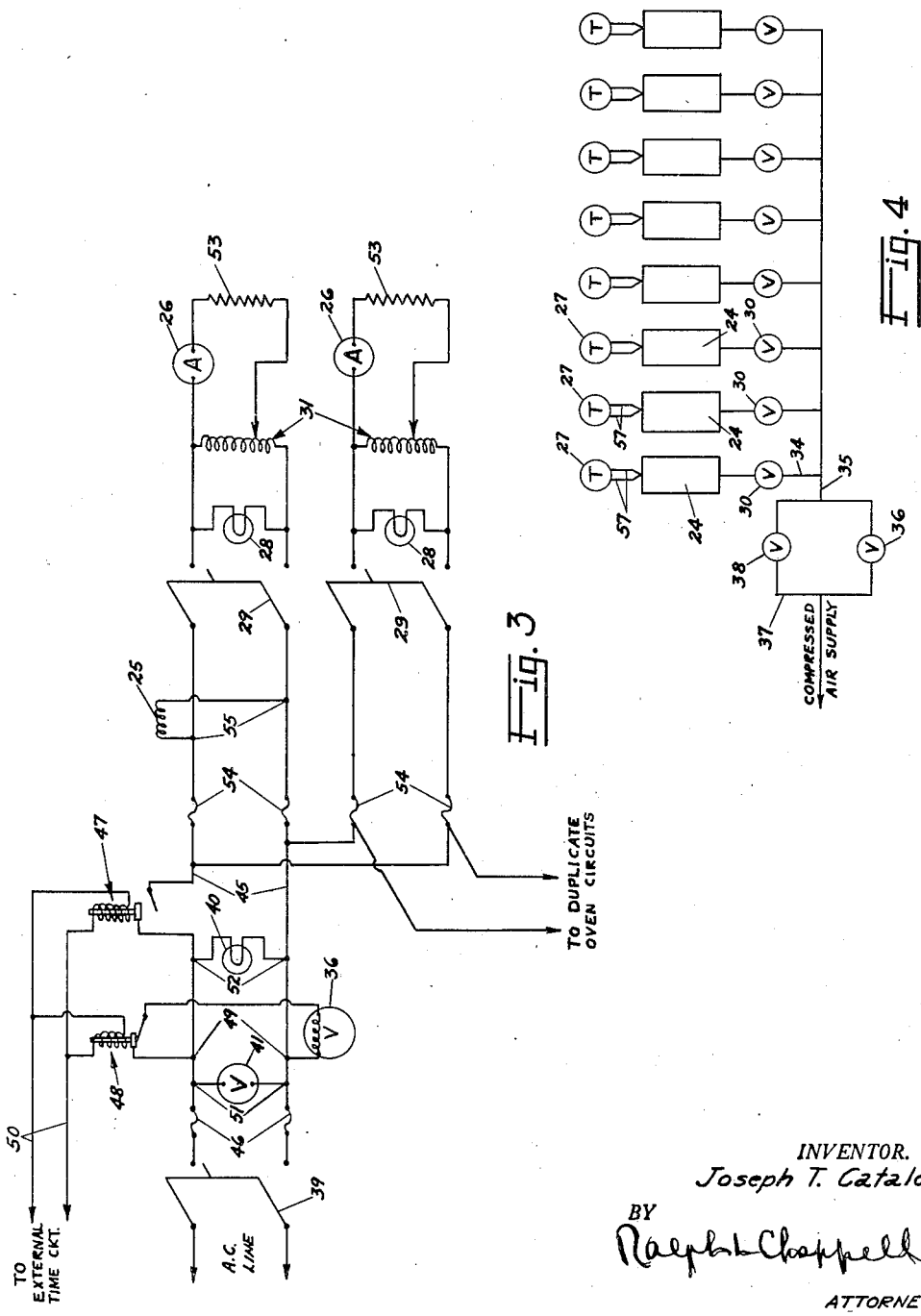
INVENTOR.
Joseph T. Cataldo
BY
Ralph L Chappell
ATTORNEY.

Patented Mar. 15, 1949

2,464,213

UNITED STATES PATENT OFFICE 2,464,213

APPARATUS FOR TESTING MATERIALS

Joseph T. Cataldo, New York, N. Y.

Application May 15, 1945, Serial No. 593,906

7 Claims. (Cl. 257—3)

(Granted under the act of March 3, 1883, as amended April 30, 1928; 370 O. G. 757)

This invention relates to apparatus for testing materials which, during their normal usage, are subjected to extended periods of heating and cooling, and more particularly relates to an apparatus in which the material under test is automatically subjected on a time-cycling basis to alternate periods of electric heating and cooling.

An example of one of the many uses to which the present invention may be applied is in the testing of thermal elements of temperature-indicating systems. Previous methods of testing these elements consisted in subjecting them to intermittent heating in an electric oven. In the periods between heating, however, the elements did not cool to room temperature as would be the case during the longer time interval in normal usage.

An object of the present invention is therefore to provide an apparatus for testing material wherein the test material is automatically subjected to alternate periods of heating and of cooling to room temperature thereby more closely simulating actual conditions.

Another object is to provide an apparatus wherein a substantially uniform temperature is maintained in the testing oven during the heating period.

A further object is to provide automatically controlled testing apparatus for alternately heating and cooling the object under test.

A still further object is to provide an automatically controlled test pier for simultaneously running a plurality of thermal tests on a time cycling basis.

Further objects and advantages of this invention, as well as its construction, arrangement and operation, will be apparent from the following description and claims in connection with the accompanying drawings, in which, Fig. 1 is a front elevation of the testing apparatus embodying this invention, Fig. 2 is a side elevation of the apparatus shown in Fig. 1, Fig. 3 is a diagrammatic sketch showing the electrical circuit used in the apparatus of Fig. 1, and Fig. 4 is a diagrammatic sketch of the layout of compressed air lines used in the apparatus of Fig. 1.

Referring to the drawings in detail, Figs. 1 and 2, show a bench 21 supporting boxes 22 and central control box 23. Upon the boxes 22 are mounted ovens 24 and upon the central control box 23 is mounted a magnetic counter 25.

Each control box 22 is provided with an ammeter 26 to indicate the current flowing in its accompanying oven, a temperature indicator 27 to indicate the temperature in the oven, a pilot light 28 to show when the oven is heating, a switch 29 for cutting the oven out individually from the main electrical circuit, and an air valve 30 for cutting the oven out of the main air line.

Below each control box 22 upon the table 21 is a variable transformer 31 of the type known to the electrical art by the trade name "Variac" for controlling the current in the accompanying oven.

The electric ovens 24 for the testing of thermal elements may be constructed of resistance wire wound on the outside surface of a ceramic tubing. The tubing is enclosed in a section of steel pipe with asbestos fibre filler to insulate the heater wiring from the steel pipe. The wiring is connected at terminals 32 to leads 33 through the control boxes 22 to the main electrical circuit.

Each oven 24 is provided with an air line 34 (Fig. 4) connected through valves 30 to the main air line 35. The main air line 35 is provided with an electrically controlled magnetic air valve 36, around which there is a by-pass line 37 containing a needle valve 38. The main air line 35 is connected to a compressor or other source of air (not shown). Fig. 4 shows the complete piping layout.

The central control box 23 contains a switch 39 on the main electrical supply line between the source of electrical energy and the bank of ovens, a pilot lamp 40 to indicate when current is flowing from the source of energy to the ovens, and a voltmeter 41 to indicate the voltage across the bank of ovens. The central control box 23 also contains electrical relays (shown in the electrical circuit diagram, Fig. 3) for the oven heating circuit and for the electrically controlled magnetic air valve 36 and the necessary fuses (Fig. 3) and connections to each oven 24 and to the magnetic counter 25.

In one of the ovens 24 is shown a test sample 42, in this instance a thermocouple element of a temperature-indicating system. A lead 43 from the thermocouple element is connected to a portable galvanometer-type temperature-indicating instrument 44. Undue oxidation of the thermocouple element during the test reduces the sensitivity of the element and correspondingly a false temperature will be recorded by the indicating instrument 44. By comparing this temperature with the actual temperature of the oven the change in sensitivity of the element may be determined. Optionally, in the testing of other objects, other means for determining the failure of the test specimen may be used.

In Fig. 3, a main electrical supply line 45 is shown connected to the ovens 24 from a suitable source of power, which may optionally be 115 volt A. C., through a switch 39, fuses 46, and oven relay 47. The magnetic-valve circuit containing magnetic valve 36 and magnetic-valve relay 48 is placed across the main line 45 at 49. The magnetic valve relay 48 and oven relay 47 are actuated by an external time-cycling circuit 50 connected to a conventional timing device (not shown). The magnetic valve relay 48 is normally closed and the oven relay 47 is normally open, i. e., when not energized by the external time cycling-circuit. Voltmeter 41 and pilot light 40 are connected across the main line 45 at 51 and 52 respectively. The respective ovens 24 represented by resistances 53 in the wiring diagram, are connected in parallel across the main line 45 through suitable fuses 54, and switches 29. The magnetic counter 25 is connected as at 55 across the leads to one of the ovens between the fuse 54 and switch 29. Connected in the line to each oven are the oven pilot lights 28, variable transformers 31 and ammeters 26.

In addition to the air-line layout (previously explained) Fig. 4 shows the connection of the temperature indicators 27 to each oven, as at 57.

In operation, test samples, as 42, are placed in each oven. The switches 29 to each oven 24 are closed, the valves 30 in the air lines are opened, and the switch 29 in the main electrical supply line is closed. The external time-cycling circuit 50 energizes both the oven relay 47 and the magnetic-valve relay 48 (see Fig. 3). With the oven relay 47 energized, the oven circuit is completed and current flows through the ovens 24. The amount of current flowing through each oven 24 can be controlled individually by its accompanying variable transformer 31.

Simultaneously with the closing of the oven circuit the magnetic counter 25 is tripped and the normally closed magnetic-valve relay 48 opens. When the magnetic-valve relay 48 is open no compressed air can flow past the magnetic valve 36. This cycle is maintained for a specified time period during which the temperature in the ovens 24 rises. To prevent hot spots and to obtain a substantially uniform temperature in the ovens 24, a trickle of compressed air is allowed to flow through the ovens by slightly opening needle valve 38 in the by-pass line 37. After the specified time period the relays 47 and 48, and magnetic counter 25 are deenergized by the time-cycling device. This cuts off the current flowing through the ovens 24. When the magnetic-valve relay 48 is deenergized the magnetic-valve circuit closes and the magnetic valve 36 opens and allows compressed air to flow to the ovens 24, reducing the temperature of the oven and the test sample back to room temperature. The alternate heating and cooling periods continue automatically until the tests are completed.

If the test sample consists of a thermocouple unit 42 as shown, it can be tested for change in sensitivity by connecting its lead 43 to the galvanometer temperature-indicating device 44. If the sample in an oven fails to meet specifications, the oven can be cut out of both the electrical circuit and from the main air line without disturbing the remaining ovens.

The apparatus of the present invention provides a fast and accurate means of running a plurality of thermal life tests. The temperature of the test specimen drops from as high as 1200° F. at the end of the heating period to room temperature within a few minutes. Only one portable indicating instrument is necessary, and once set up the test requires little attention as it is necessary only periodically to check the test samples for breakdown, the rest of the operation being entirely automatic.

It is to be understood that various modifications and changes can be made in this invention without departing from the spirit and scope thereof as set forth in the appended claims.

The method of testing herein disclosed is claimed in my copending divisional application, Serial No. 677,943, filed June 20, 1946.

The invention described herein may be manufactured and used by or for the Government of the United States of America for governmental purpose without the payment of any royalties thereon or therefor.

What is claimed is:

1. Thermal test apparatus comprising an electric oven, means generating a signal having a predetermined time cycle, control means in the electrical circuit to said electric oven and responsive to said signal for closing and opening said circuit in accordance with said time cycle, an air line connected to said oven and to a source of compressed air, a valve on said air line, and control means responsive to said signal and associated with said valve for closing said valve in synchronism with the closing of said electrical circuit and for opening said valve in synchronism with the opening of said electrical circuit, whereby to subject the said oven alternately to electrical heating and compressed air cooling.

2. Automatic test apparatus comprising an electric oven, an air line connected thereto, an electrically controlled valve in the said air line, a by-pass air line containing a needle valve around said electrically controlled valve, and automatic control means in the electrical circuits to the said electric oven and to the said electrically controlled valve for simultaneously closing the said oven circuit causing the oven to heat and opening the said circuit to the electrically controlled valve causing the said valve to close.

3. Automatic test apparatus comprising an electric oven, a time cycling circuit, an air line connected to said oven for introducing air therein, said air line containing an electrically controlled valve, the electrical circuit to said oven containing a relay connected to said time cycling circuit, the said relay being operable when energized by said time cycling circuit to close the oven heating circuit, and the electrical circuit to the said magnetic valve containing a relay connected to the said time cycling circuit and being operable when energized by said time cycling circuit to open the said magnetic valve circuit thereby closing the said magnetic valve.

4. Automatic test apparatus comprising a plurality of electric ovens connected to a common electrical circuit, a main air line containing branch air lines connected to each of said ovens, an electrically controlled valve in the said main air line between the said branch air lines and the air supply, the said electrical circuit to said electric ovens containing a relay operable when energized to close said circuit thereby causing the ovens to heat, the electrical circuit to said electrically controlled valve containing a relay operable when energized to open said circuit to said electrically controlled valve causing said valve to close, and automatic means for alternately energizing and deenergizing the said relays simultaneously.

5. Automatic test apparatus comprising a plurality of electric ovens connected to a common electrical circuit, a main air line containing branch air lines connected to each of said ovens, an electrically controlled valve in the said main air line between the said branch air lines and the air supply, a by-pass air line containing a needle valve in the said main air line around the said electrically controlled valve, the said electrical circuit to the said electric ovens containing a relay operable when energized to close said circuit thereby causing the ovens to heat, the electrical circuit to said electrically controlled valve containing a relay operable when energized to open the said circuit to said electrically controlled valve causing the said valve to close, automatic means for alternately energizing and deenergizing the said relays simultaneously, and electrically operated counter means connected to the said oven circuit for indicating the number of heating periods.

6. The apparatus defined in claim 5 wherein said automatic means comprises time-controlled means for generating a signal having a predetermined time cycle, and said oven-circuit relay and said valve-circuit relay are responsive to said signal.

7. Apparatus comprising an electric oven, an air line connected thereto, an electrically controlled valve in the said air line, a by-pass air line around said electrically controlled valve and containing a second valve, and control means in the electrical circuits to the said electric oven and to the said electrically controlled valve for simultaneously closing the said oven circuit causing the oven to heat and opening the said circuit to the electrically controlled valve causing the said valve to close.

JOSEPH T. CATALDO.

REFERENCES CITED

The following references are of record in the file of this patent:

UNITED STATES PATENTS

| Number | Name | Date |
|---|---|---|
| 1,848,440 | Spitzenberger et al. | Mar. 8, 1932 |
| 1,873,838 | Gebhard | Aug. 23, 1932 |
| 1,941,339 | Currier | Dec. 26, 1933 |
| 1,994,917 | McGregor | Mar. 19, 1935 |
| 2,164,730 | Backstrom | July 4, 1939 |
| 2,188,303 | Roberts | Jan. 30, 1940 |
| 2,301,316 | Orr et al. | Nov. 10, 1942 |
| 2,347,661 | Butland | May 2, 1944 |